(12) United States Patent
Oishi

(10) Patent No.: US 6,542,332 B1
(45) Date of Patent: Apr. 1, 2003

(54) MAGNETIC DISC CARTRIDGE WITH CENTER CORE COVER MEMBER

(75) Inventor: Kengo Oishi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/674,146

(22) PCT Filed: Apr. 21, 1999

(86) PCT No.: PCT/JP99/02122

§ 371 (c)(1),
(2), (4) Date: Oct. 27, 2000

(87) PCT Pub. No.: WO99/56281

PCT Pub. Date: Nov. 4, 1999

(30) Foreign Application Priority Data

Apr. 27, 1998 (JP) ............................................ 10-116582

(51) Int. Cl.[7] .............................................. G11B 23/03
(52) U.S. Cl. ......................................................... 360/133
(58) Field of Search ............................. 360/133, 99.01, 360/99.02, 99.05, 99.12

(56) References Cited

U.S. PATENT DOCUMENTS

| | | | | |
|---|---|---|---|---|
| 4,899,244 A | * | 2/1990 | Morse | 360/133 |
| 5,090,010 A | * | 2/1992 | Takahashi | 360/133 |
| 6,147,962 A | * | 11/2000 | Srinivasan et al. | 360/133 |
| 6,154,441 A | * | 11/2000 | Sandstrom et al. | 369/282 |
| 6,285,529 B1 | * | 9/2001 | Uwabo et al. | 360/133 |
| 6,426,849 B1 | * | 7/2002 | Osaka | 360/133 |

FOREIGN PATENT DOCUMENTS

| | | |
|---|---|---|
| EP | 0 352 918 | 1/1990 |
| EP | 0 497 604 | 8/1992 |

OTHER PUBLICATIONS

International Search Report.

* cited by examiner

Primary Examiner—Jefferson Evans
(74) Attorney, Agent, or Firm—Sughrue Mion, PLLC

(57) ABSTRACT

A magnetic disc cartridge includes a magnetic disc with a center core and a casing which contains therein the magnetic disc for rotation and is provided in its lower side with a center core opening for giving access to the center core to a disc drive member of a disc drive system. A cover member which covers the space between the center core opening and the center core is provided on the lower side of the casing.

5 Claims, 2 Drawing Sheets

MAGNETIC DISC CARTRIDGE WITH CENTER CORE COVER MEMBER

FIELD OF THE INVENTION

This invention relates to a magnetic disc cartridge comprising a casing and a magnetic disc with a center core which is contained in the casing, and more particularly to a dust-proof structure for a lower side of the casing where an opening for giving access to the center core is formed.

BACKGROUND OF THE INVENTION

There has been known a magnetic disc cartridge comprising a casing formed of upper and lower casing halves and a magnetic disc supported for rotation in the casing. High reliability is required when information is recorded on the magnetic disc and reproduced from the magnetic disc by use of a disc drive system.

For example, it is important that the magnetic disc and/or the magnetic head are kept free from dust which causes so-called drop-out. Dusts include those generated inside the casing and those entering the casing from the exterior through openings in the casing.

A center core opening for giving access to the center core to a spindle of the disc drive system is formed on the lower side of the casing and is normally kept opened. Dusts which enter the casing through the gap between the center core opening and the center core are more apt to give rise to a problem.

Further, as the packing density of the magnetic disc is increased, the line recording density and the track density are increased. Accordingly just a small of amount of dusts adhering to the surface of the magnetic disc can cause drop-out, and there has been a demand for higher dust-proof performance.

In conventional magnetic disc cartridges containing therein a magnetic disc whose recording capacity is relatively small, a liner such as of unwoven fabric is provided on the inner surface of the casing and the liner is brought into contact with the surface of the magnetic disc by a lifter to wipe off dusts on the magnetic disc.

However in the case of a larger capacity magnetic disc cartridge, the magnetic disc is rotated at a higher speed in order to increase the data transfer speed. In order to stably rotate the magnetic disc at a high speed, it is preferred that the torque be reduced. For this purpose, there is a trend to reduce the contact pressure between the liner and the magnetic disc. Further there is a trend to omit the liner in order to suppress generation of dusts inside the casing. Thus entry of dust into the casing must be prevented more strictly.

As the rotating speed of the magnetic disc is increased, an air flow from the central portion of the magnetic disc toward the outer edge of the magnetic disc is generated by centrifugal force in response to rotation of the magnetic disc and the pressure inside the casing becomes low at the central portion thereof, which introduces air into the casing through the center core opening. Since the air introduced into the casing through the center core opening carries dusts, measures for preventing entry of dusts through the center core opening are effective.

Though entry of dusts through the center core opening can be prevented by providing a shutter member for opening and closing the center core opening, this approach will give rise to a problem in ensuring so-called "downward compatibility".

That is, a disc drive system for a larger capacity magnetic disc cartridge is generally arranged to be capable of driving a conventional magnetic disc cartridge as well as the larger capacity magnetic disc cartridge. This is generally referred to as "downward compatibility". When the disc drive system for a larger capacity magnetic disc cartridge is provided with such "downward compatibility", it is preferred that the disc drive system can drive either of the magnetic disc cartridges by a single mechanism. Form this view point, it is disadvantageous that the larger capacity magnetic disc cartridge is provided with a shutter member for opening and closing the center core opening.

SUMMARY OF THE INVENTION

In view of the foregoing observations and description, the primary object of the present invention is to provide a magnetic disc cartridge in which the dust-proof performance is increased without interfering with downward compatibility.

The magnetic disc cartridge of the present invention comprises a magnetic disc with a center core and a casing which contains therein the magnetic disc for rotation and is provided in its lower side with a center core opening for giving access to the center core to a disc drive member of a disc drive system, and is characterized in that a cover member which covers the space between the center core opening and the center core is provided on the lower side of the casing.

Typically, the cover member is a ring-like member of a resilient material such as a plastic sheet. When the cover member is a ring-like member, the outer diameter of the cover member should be larger than the inner diameter of the center core opening, and the inner diameter of the cover member should be smaller than the outer diameter of the portion of the center core exposed through the center core opening so that the cover member covers at least the space between the center core opening and the center core. It is preferred that the inner diameter of the cover member be selected so that a drive hole which is formed in the center core to be brought into engagement with a drive pin of a disc drive system is not closed by the cover member even if the center core is positioned off-centered with respect to the center core opening.

It is preferred that the cover member be received in a recess formed in the lower side of the lower casing half so that the lower surface of the cover member is positioned flush with the lower side of the lower casing half.

In the magnetic disc cartridge of this embodiment, the cover member prevents entry of dusts through the space between the inner peripheral edge of the center core opening and the center core, whereby adhesion of dusts to the surface of the magnetic disc is suppressed and generation of drop-out is suppressed, which increases the reliability of the magnetic disc cartridge. Further, since the structure of the center core and the center core opening is the same as that in the smaller capacity magnetic disc cartridge, the disc drive system for the magnetic disc cartridge of this embodiment can also drive the conventional magnetic disc cartridge without additional drive mechanism, that is, downward compatibility can be easily ensured.

PREFERRED EMBODIMENT OF THE INVENTION

Figure 1:
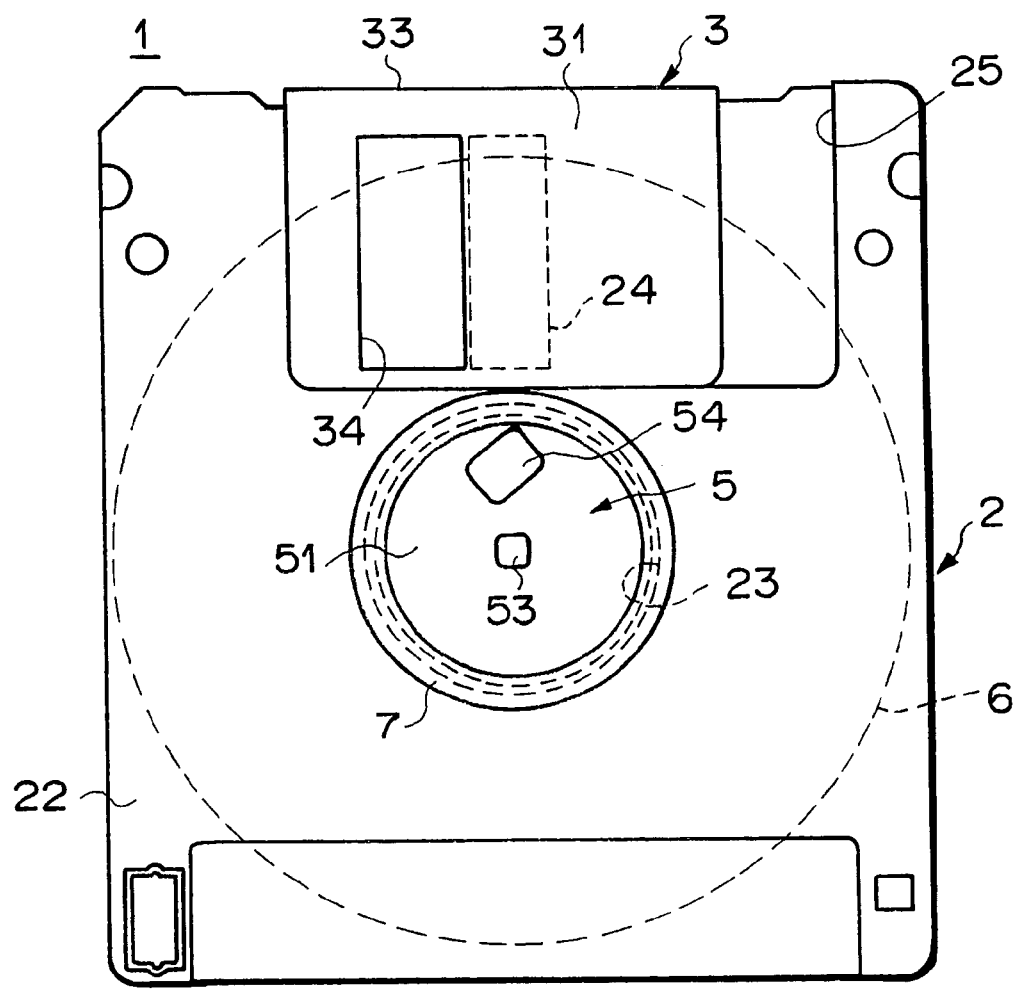
FIG. 1 is a bottom view of a magnetic disc cartridge in accordance with an embodiment of the present invention.

In FIG. 1, a magnetic disc cartridge 1 in accordance with an embodiment of the present invention comprises a thin casing 2 formed of upper and lower casing halves 21 and 22, and a flexible magnetic disc 6 supported for rotation in the casing 2. The upper and lower casing halves 21 and 22 are formed by molding of resin such as acrylonitrile-butadiene copolymer. A center core 5 is fixed to the center of the magnetic disc 6.

The magnetic disc 6 comprises magnetic layers formed on opposite sides of a disc-like flexible base such as of polyethylene terephthalate. The center core 5 is formed by pressing a stamped sheet metal of a predetermined shape, and comprises a cylindrical portion 51 and a flange portion 52 which extends outward from the upper end portion of the cylindrical portion 51. The cylindrical portion 51 is inserted into a central opening of the magnetic disc 6 and an inner edge portion of the magnetic disc 6 is bonded to the lower surface of the flange portion 52. A central hole 53 is formed in the bottom face of the cylindrical portion 51 at the center thereof and a drive hole 54 is formed beside the central hole 53.

Figure 2:
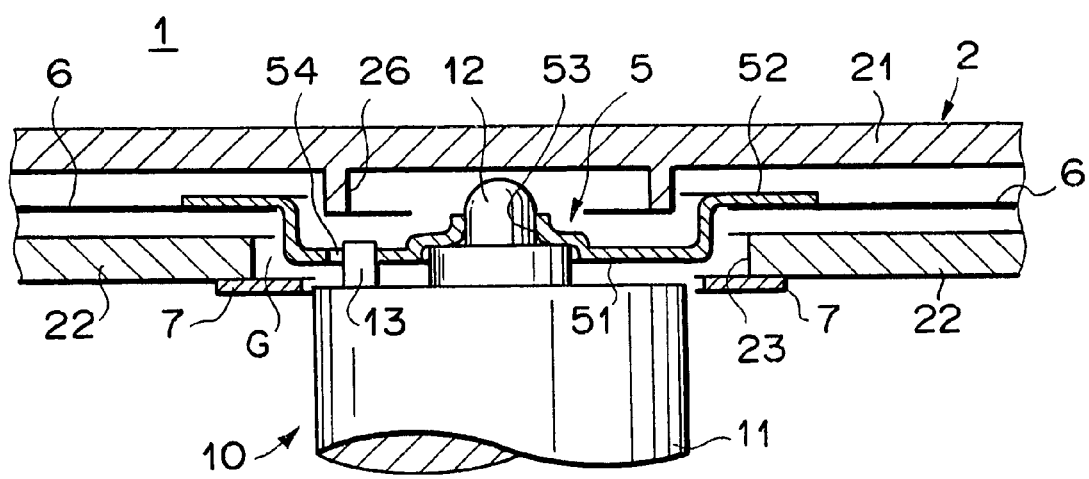
FIG. 2 is a fragmentary cross-sectional view of the magnetic disc cartridge in a driven state.

As can be seen from FIG. 2, the center core 5 is driven by a rotary shaft 11 of a spindle motor 10 of a disc drive system. That is, a spindle 12 projecting from the tip of the rotary shaft 11 is inserted into the central hole 53 to locate the center core 5 with respect to the rotary shaft 11 and a drive pin 13 projecting from the tip of the rotary shaft 11 beside the spindle 12 is brought into engagement with the drive hole 54 to transmit torque to the center core 5.

The casing 2 is square in shape, and a circular center core opening 23 is formed in the lower casing half 22 at the center thereof. The bottom face of the cylindrical portion 51 of the center core 5 is exposed through the center core opening 23. The upper and lower casing halves 21 and 22 are provided with magnetic head insertion openings 24 and a shutter member 3 for opening and closing the magnetic head insertion openings 24 is mounted on the casing 2 to be slidable in a shallow recesses 25 on opposite sides of the casing 2.

The shutter member 3 is like a channel in cross-section and comprises upper and lower plate portions 31 which covers the upper and lower sides of the casing at a front portion thereof and connecting portion 33 which connects the upper and lower plate portions 31 and covers the front end face of the casing 2. Each of the upper and lower plate portions 31 is provided with an opening 34 which is brought into alignment with the magnetic head insertion opening 24 when the shutter member 3 is moved to an opening position. Normally the shutter member 3 is held in a closing position where the openings 34 are out of alignment with the magnetic head insertion openings 24, whereby foreign matters such as dusts cannot enter the casing 2 through the magnetic head insertion openings 24.

An annular protrusion 26 extends downward from the lower surface of the upper casing half 21 into the cylindrical portion 51 of the center core 5 and limits movement of the magnetic disc 6 in radial directions relative to the casing 2.

An annular cover member 7 is provided on the lower surface of the lower casing half 22 to extend inward from the inner peripheral edge of the center core opening 23 and cover the gap G between the inner peripheral edge of the center core opening 23 and the outer peripheral edge of the bottom face of the cylindrical portion 51 of the center core 5.

The cover member 7 is a ring-like member of a resilient material such as a plastic sheet. The outer diameter of the cover member 7 is larger than the inner diameter of the center core opening 23, and the inner diameter of the cover member 7 is smaller than the outer diameter of the bottom face of the cylindrical portion 51 of the center core 5 so that the cover member 7 covers at least the gap G. The inner diameter of the cover member 7 is selected so that the cover member 7 covers the portion outside the drive hole 54 and the drive hole 54 is not closed by the cover member 7 even if the center core 5 is positioned off-centered with respect to the center core opening 23.

The outer peripheral edge portion of the cover member 7 is fixed to the lower surface of the lower casing half 22 around the center core opening 23 by ultrasonic welding, bonding or the like. It is preferred that the cover member 7 be received in a recess (not shown) formed in the lower surface of the lower casing half 22 so that the lower surface of the cover member 7 is positioned flush with the lower surface of the lower casing half 22.

When the magnetic disc cartridge 1 of this embodiment is loaded in a disc drive system, the rotary shaft 11 of the spindle motor 10 is moved upward, whereby the spindle 12 at the tip of the rotary shaft 11 is inserted into the central hole 53 and the drive pin 13 is brought into engagement with the drive hole 54 as shown in FIG. 2. Then the magnetic disc 6 is rotated at a predetermined speed by the spindle motor 10 by way of the rotary shaft 11. Further in response to loading the magnetic disc cartridge 1 in the disc drive system, the shutter member 3 is moved to the opening position to open the magnetic head insertion opening 24 and a magnetic head (not shown) gets access to the magnetic disc 6 for recording or reproduction.

When the magnetic disc 6 is rotated, an air flow from the central portion of the magnetic disc 6 toward the outer edge of the magnetic disc 6 is generated by centrifugal force and the pressure inside the casing becomes low at the central portion thereof. However the cover member 7 prevents entry of dusts through the gap G between the center core opening 23 and the center core 5. Further, during storage of the magnetic disc cartridge, the cover member 7 covers the gap G between the center core opening 23 and the center core 5 and prevents entry of dusts through the gap G.

What is claimed is:

1. A magnetic disc cartridge comprising a magnetic disc with a center core and a casing which contains therein the magnetic disc for rotation and is provided in its lower side with a center core opening for giving access to the center core to a disc drive member of a disc drive system, wherein the improvement comprises:

a discrete cover member, which covers the space between the center core opening and the center core, fixed to the lower side of the casing.

2. The magnetic disc cartridge as defined in claim 1, wherein the cover member is a ring-like member of resilient material.

3. The magnetic disc cartridge as defined in claim 2, wherein the outer diameter of the cover member is larger than the inner diameter of the center core opening, and the inner diameter of the cover member is smaller than the outer diameter of the portion of the center core exposed through the center core opening.

4. The magnetic disc cartridge as defined in claim 3, wherein the inner diameter of the cover member is selected so that the cover member covers the portion outside a drive hole with which the disc drive member is not closed by the cover member even if the center core is positioned off-centered with respect to the center core opening.

5. The magnetic disc cartridge as defined in claim 4, wherein the casing includes a lower side and a recess formed in the lower side, and wherein the cover member is received in the recess.

* * * * *